(12) United States Patent
Teboulle et al.

(10) Patent No.: US 11,031,972 B2
(45) Date of Patent: Jun. 8, 2021

(54) METHOD FOR AUTOMATICALLY SELECTING A FREQUENCY BAND

(71) Applicant: SAGEMCOM ENERGY & TELECOM SAS, Rueil Malmaison (FR)

(72) Inventors: Henri Teboulle, Rueil Malmaison (FR); Ziv Roter, Rueil Malmaison (FR); Kaveh Razazian, Rueil Malmaison (FR); Rahid Djafri, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/617,993

(22) PCT Filed: May 22, 2018

(86) PCT No.: PCT/EP2018/063360
§ 371 (c)(1),
(2) Date: Nov. 27, 2019

(87) PCT Pub. No.: WO2018/219715
PCT Pub. Date: Dec. 6, 2018

(65) Prior Publication Data
US 2020/0112337 A1    Apr. 9, 2020

(30) Foreign Application Priority Data
May 31, 2017    (FR) ........................ 1754788

(51) Int. Cl.
*H04B 3/54*    (2006.01)
*H04B 3/46*    (2015.01)

(52) U.S. Cl.
CPC ............... *H04B 3/544* (2013.01); *H04B 3/46* (2013.01); *H04B 2203/5433* (2013.01); *H04B 2203/5495* (2013.01)

(58) Field of Classification Search
CPC .. H04B 3/544; H04B 3/46; H04B 2203/5433; H04B 2203/5495; H04B 2203/5425; H04B 3/54
See application file for complete search history.

(56) References Cited

U.S. PATENT DOCUMENTS 4,008,467 A * 2/1977 Pattantyus-Abraham ................... H04B 3/54
307/12
5,245,633 A    9/1993 Schwartz et al.
(Continued)

FOREIGN PATENT DOCUMENTS

WO    2016/166238 A1    10/2016

OTHER PUBLICATIONS

Jul. 17, 2018 International Search Report issued in International Patent Application No. PCT/EP2018/063360.

*Primary Examiner* — Jean B Corrielus
(74) *Attorney, Agent, or Firm* — Oliff PLC; R. Brian Drozd

(57) ABSTRACT

The invention relates in particular to a method executed by a control device, for a mesh communication network, allowing selection of an optimum frequency band, the method comprising the steps of determining network quality information, if the quality information is below a first threshold, then: sending, to each device in the network, a message comprising an instruction to perform a frequency band quality test, collecting, at the end of the quality test, for each device, quality data for each frequency band, determining, for each frequency band, a quality indicator, and selecting a so-called optimum frequency band as being the frequency (Continued)

band associated with the best indicator, when the so-called optimum frequency band is different from the frequency band used, then sending, to each device, an instruction to use the so-called optimum frequency band.

16 Claims, 3 Drawing Sheets

(56) References Cited

U.S. PATENT DOCUMENTS

| | | | | |
|---|---|---|---|---|
| 8,712,420 | B2* | 4/2014 | Marti | H04W 4/029 |
| | | | | 455/446 |
| 8,937,928 | B2* | 1/2015 | Ngo | H04W 72/08 |
| | | | | 370/332 |
| 9,686,688 | B2* | 6/2017 | Hedayat | H04B 7/063 |
| 10,027,006 | B2* | 7/2018 | Cheng | H01P 1/2002 |
| 10,085,068 | B2* | 9/2018 | Iwami | H04L 65/602 |
| 2002/0060995 | A1* | 5/2002 | Cervello | H04W 72/02 |
| | | | | 370/332 |
| 2006/0135191 | A1* | 6/2006 | Matsui | H04B 17/309 |
| | | | | 455/515 |
| 2008/0057866 | A1* | 3/2008 | Schwager | H04B 3/54 |
| | | | | 455/41.1 |
| 2012/0134395 | A1 | 5/2012 | Varadarajan et al. | |
| 2016/0127056 | A1 | 5/2016 | Soman et al. | |
| 2016/0127515 | A1 | 5/2016 | Kim et al. | |

* cited by examiner

METHOD FOR AUTOMATICALLY SELECTING A FREQUENCY BAND

FIELD OF THE INVENTION

The present invention relates to the field of mesh communication networks, that is to say a communication network in which various electronic devices in the network are connected peer to peer. The invention relates more particularly to the field of powerline communication networks, in particular communication networks conforming to the G3-PLC (G3 Power Line Communication) standard developed by the G3-PLC Alliance.

SUMMARY

A mesh communication network (hereinafter "network") in conformity with the G3-PLC standard typically comprises a first electronic device, referred to as a data concentrator (hereinafter "concentrator"), placed at the root of the network, and a plurality of electronic devices, for example communicating electricity meters or smart meters (hereinafter "meters"). Each electronic device, both concentrator and meters, is also referred to as a node of the network.

FIG. 1 illustrates such a mesh communication network 100. A data concentrator DC is a particular node in the communication network since it is connected, via a communication network 110, to at least one control device SC of an information system of an operator operating the mesh communication network 100. The communication network 110 may be the internet or a mobile communication network, for example in accordance with a GSM (Global System for Mobile communications), UMTS (Universal Mobile Telecommunications System) or LTE (Long Term Evolution) standard. The various other nodes in the mesh communication network 100 are typically communicating meters, M1, M2, M3, . . . M15. All the nodes, or electronic devices, DC, M1, M2, M3, . . . M15, are connected to the same electricity network and, in accordance for example with the specifications of the G3-PLC standard, communicate via the same frequency band. This frequency band is for example a frequency band defined by the European Committee for Electrotechnical Standardization (CENELEC) (so called "CENELEC A" or "CENELEC B" frequency bands, in accordance with the standard "CENELEC EN50065-1"), by the Japanese Association of Radio Industries and Businesses (ARIB) or by the US Federal Communications Commission (FCC). Each node in the mesh communication network 100, particularly the communicating meters M1, M2, M3, . . . M15, may be compatible with possibly a plurality of frequency bands, and thus be used with one or other of the frequency bands. Nevertheless, for reasons of optimisation of the cost of manufacturing the electronic devices, each node can use only one frequency band at a time for communicating on the mesh communication network 100. Being able to use several frequency bands at a time would require having, for a node, a more complex communication module, for example comprising two modems, and therefore more expensive. More prosaically, the G3-PLC standard does not at the present time provide for the simultaneous use of a plurality of frequency bands. Thus all the nodes DC, M1, M2, M3, . . . M15 in the mesh communication network 100 communicate using the same single predefined frequency band, ideally chosen to allow good performances.

However, since the environmental conditions of the network may for example vary over time, it may happen that the frequency band initially chosen is no longer optimum and that another frequency band, possibly usable by the nodes in the network 100, may have become more suitable and allow better performances. The G3-PLC standard does not describe any mechanism making it possible to envisage a dynamic switching from one frequency band to another frequency band. The mesh communication network 100 may then be in a situation where the nodes are communicating via a non-optimum frequency band, with possibly degraded performances, and without any possibility of automatically using another frequency band that would afford better performances.

It is therefore necessary to propose a method for overcoming these drawbacks.

The invention relates to a system for a mesh communication network comprising a plurality of electronic devices connected to a shared medium and using a first frequency band from among a plurality of frequency bands for exchanging messages, each electronic device being suitable for using each frequency band in the plurality of frequency bands, and a control device. The system allows a selection of a so-called optimum frequency band among the plurality of frequency bands, the control device is suitable for:

sending, to each electronic device, a first message comprising an instruction to perform a test on the quality of the plurality of frequency bands in a predetermined order and a first item of synchronisation information for performing said quality test, collecting at the end of the quality test, for each electronic device, quality data associated with each frequency band, determining, for each frequency band, a quality indicator associated with the frequency band from the quality data collected, and selecting a so-called optimum frequency band among the plurality of frequency bands, said so-called optimum frequency band being the frequency band associated with a quality indicator of maximum value, when the so-called optimum frequency band corresponds to a second frequency band different from the first frequency band, then:

sending, to each electronic device, a second message comprising an instruction to use the so-called optimum second frequency band instead of the first frequency band.

Each electronic device is further suitable for, following the reception of the first message:

determining a moment of start of the quality test according to the first synchronisation information, and as from said start moment, successively using, in the predetermined order, each frequency band in the plurality of frequency bands for a predetermined period associated with the frequency band used, recording, in association with each frequency band used, quality data associated with messages received by the electronic device during each predetermined period of use of the frequency band, sending, to the control device, a message comprising the quality data associated with each frequency band, and when a second message is received, using the so-called optimum second frequency band instead of the first frequency band for sending and receiving messages.

Advantageously, the system allows the automatic selection of a so-called optimum frequency band instead of a frequency band initially used by the communication network. For this purpose, the various electronic devices, at the initiative of a control device detecting that the operating quality of the network is not satisfactory, can in a synchronised fashion switch onto each of the frequency bands potentially usable and collect quality data. The control device, after having recovered said quality data, can determine whether it is opportune to switch to a new frequency band referred to as the optimum frequency band. In this case, the control device sends a first message making it possible to initiate a synchronised switching of all the nodes in the network to the so-called optimum frequency band.

According to a supplementary embodiment of the invention, an electronic device among the plurality of electronic devices is also suitable, during the quality test, and during each predetermined period of use of a frequency band, for sending messages to all the electronic devices.

Advantageously, it is thus ensured that each electronic device receives messages during the quality test for each frequency band. Thus the method guarantees that each electronic device can record quality data associated with each frequency band.

According to a supplementary embodiment of the invention, the second message comprising a second item of synchronisation information, each electronic device is suitable for, when a second message is received, using the optimum second frequency band instead of the first frequency band for sending and receiving messages as from a moment determined according to the second item of synchronisation information.

Advantageously, the switching of all the electronic devices in the network is thus synchronised at the same moment defined according to the second item of synchronisation information.

According to a supplementary embodiment of the invention, the second message comprising a third item of synchronisation information, each electronic device is suitable, when a second message is received, for using the optimum second frequency band instead of the first frequency band for sending and receiving messages as from a moment determined according to the second item of synchronisation information and then once again using the first frequency band for sending and receiving messages as from a moment determined according to the third item of synchronisation information.

Advantageously, a mechanism of backtracking to the first frequency band is provided for each electronic device in the event of a problem. The moment of the backtracking is synchronised between all the electronic devices according to the third item of synchronisation information.

The invention also relates to a method, for a mesh communication network comprising a plurality of electronic devices connected to a shared medium and using a first frequency band among a plurality of frequency bands for exchanging messages, each electronic device being suitable for using each frequency band in the plurality of frequency bands, and a control device, the method allowing selection of a so-called optimum frequency band from the plurality of frequency bands, the method is executed by each electronic device and comprises the steps of:
  receiving, from the control device, a first message comprising an instruction to perform a quality test on the plurality of frequency bands in a predetermined order and a first item of synchronisation information for performing said quality test,
  determining a moment of start of the quality test according to the first item of synchronisation information, and as from the start moment, successively using, in the predetermined order, each frequency band in the plurality of frequency bands for a predetermined period associated with the frequency band used,
  recording, in association with each frequency band used, quality data associated with messages received by the electronic device during each predetermined period of use of the frequency band,
  sending, to the control device, a message comprising the quality data associated with each frequency band, and
  when a second message is received comprising an instruction to switch to a so-called optimum second frequency band, using the so-called optimum second frequency band instead of the first frequency band for sending and receiving messages.

According to a supplementary embodiment of the invention, the second message comprising a second item of synchronisation information, the step of using the optimum second frequency band instead of the first frequency band for sending and receiving messages is performed as from a moment determined according to the second item of synchronisation information.

According to a supplementary embodiment of the invention, the second message comprising a third item of synchronisation information, the message comprises a subsequent step once again using the first frequency band for sending and receiving messages as from a moment determined according to the third item of synchronisation information.

According to a supplementary embodiment of the invention, the method comprises, subsequently to the step of using the so-called optimum second frequency band, the steps of:
  receiving a message comprising an identifier of an electronic device in the network and an indication of a third frequency band among the plurality of frequency bands,
  switching to the third frequency band,
  sending, to the electronic device corresponding to the identifier received, a message comprising an instruction to use the so-called optimum frequency band and an acknowledgement instruction,
  at the expiry of a predefined waiting time or on reception of the acknowledgement, switching to the so-called optimum frequency band, and then
  sending a message to the control device comprising information on the correct reception, or not, of the acknowledgement.

Advantageously, it is thus possible to switch any electronic device remaining blocked onto a third frequency band by sending an instruction to an adjacent electronic device. Said adjacent electronic device can then switch to the third frequency band in order to be able to communicate with the blocked electronic device on the third frequency band, and to send to it an instruction to switch to the so-called optimum frequency band, used for all the other electronic devices in the network. The adjacent electronic device awaits confirmation before returning to the so-called optimum frequency band, and informs the control device that the operation has taken place correctly.

The invention also relates to a method, for a mesh communication network comprising a plurality of electronic devices connected to a shared medium and using a first frequency band among a plurality of frequency bands for exchanging messages, each electronic device being suitable for using each frequency band in the plurality of frequency bands, and a control device, the method making it possible to select a so-called optimum frequency band among the plurality of frequency bands, the method being executed by the control device and comprising the steps of:
  determining information on operating quality of the communication network, if the information on operating quality of the communication network is below a first threshold, then:
  sending, to each electronic device, a first message comprising an instruction to perform a quality test on the plurality of frequency bands in a predetermined order and a first item of synchronisation information for performing said quality test,
  collecting, at the end of the quality test, for each electronic device, quality data associated with each frequency band,
  determining, for each frequency band, a quality indicator associated with the frequency band from the quality data collected, and
  selecting a so-called optimum frequency band among the plurality of frequency bands, said so-called optimum frequency band being the frequency band associated with a quality indicator of maximum value,
  when the so-called optimum frequency band corresponds to a second frequency band different from the first frequency band, then:
    sending, to each electronic device, a second message comprising an instruction to use the so-called optimum second frequency band instead of the first frequency band.

According to a supplementary embodiment of the invention, the second message comprising a second item of synchronisation information and a third item of synchronisation information, the second item of synchronisation information making it possible to define a moment of start of use of the second frequency band by each electronic device, the third item of synchronisation information making it possible to define a moment for each electronic device to return to the use of the first frequency band, the method comprises the subsequent steps of:
  determining, between the moment of start of use of the second frequency band and the moment of return to the use of the first frequency band, information on the operating quality of the communication network, and
  when said information on operating quality of the communication network is higher than a second threshold, then:
    sending, to each electronic device, a third message comprising an instruction for cancellation of re-use of the first frequency band at the moment defined by the third item of synchronisation information.

The invention also relates to an electronic device of a mesh communication network of a mesh communication network comprising a plurality of electronic devices connected to a shared medium and using a first frequency band among a plurality of frequency bands for exchanging messages, the electronic device being suitable for:
  receiving, from a control device, a first message comprising an instruction for performing a quality test on the plurality of frequency bands in a predetermined order and a first item of synchronisation information for performing said quality test,
  determining a moment of start of a quality test according to the first item of synchronisation information, and
  as from said start moment, successively using, in the predetermined order, each frequency band in the plurality of frequency bands for a predetermined period associated with the frequency band used,
  recording, in association with each frequency band used, quality data associated with messages received by the electronic device during each predetermined period of use of the frequency band,
  sending, to the control device, a message comprising the quality data associated with each frequency band, and
  when a second message is received comprising an instruction to switch to a so-called optimum second frequency band, using the so-called optimum second frequency band instead of the first frequency band for sending and receiving messages.

According to a supplementary embodiment of the invention, the second message comprising a second item of synchronisation information, the electronic device being suitable for using the optimum second frequency band instead of the first frequency band for sending and receiving messages as from a moment determined according to the second item of synchronisation information.

The invention also relates to a control device for a mesh communication network comprising a plurality of electronic devices connected to a shared medium and using a first frequency band among a plurality of frequency bands for exchanging messages, the control device being suitable for:
  determining information on operating quality of the communication network,
  if the operating quality of the communication network is below a first threshold, then:
  sending, to each electronic device, a first message comprising an instruction to perform a quality test on the plurality of frequency bands in a predetermined order and a first item of synchronisation information for performing said quality test,
  collecting, at the end of the quality test, for each electronic device, quality data associated with each frequency band,
  determining, for each frequency band, a quality indicator associated with the frequency band from the quality data collected, and
  selecting a so-called optimum frequency band among the plurality of frequency bands, said so-called optimum frequency band being the frequency band associated with a quality indicator of maximum value,
  when the so-called optimum frequency band corresponds to a second frequency band different from the first frequency band, then:
    sending, to each electronic device, a second message comprising an instruction to use the so-called optimum second frequency band instead of the first frequency band.

According to a supplementary embodiment of the invention, the second message comprising a second item of synchronisation information and a third item of synchronisation information, the second item of synchronisation information making it possible to define a moment of start of use of the second frequency band by each electronic device, the third item of synchronisation information making it possible to define a moment, for each electronic device returning to the use of the first frequency band, the control device is further suitable for:
  determining, between the moment of start of use of the second frequency band and the moment of return to the use of the first frequency band, information on the operating quality of the communication network, and
  when said information on operating quality of the communication network is higher than a second threshold, then:
  sending, to each electronic device, a third message comprising an instruction for cancellation of re-use of the first frequency band at the moment defined by the third item of synchronisation information.

The invention also relates to a computer program comprising instructions for the implementation, by a processor of an electronic device of a mesh communication network connected to a shared medium and using a first frequency band among a plurality of frequency bands for exchanging messages, the electronic device being suitable for using each frequency band in the plurality of frequency bands, a method for selecting a so-called optimum frequency band among the plurality of frequency bands, when the computer program is executed by the processor.

The invention also relates to a computer program comprising instructions for the implementation, by a processor of a control device of a mesh communication network comprising a plurality of electronic devices connected to a shared medium and using a first frequency band among a plurality of frequency bands for exchanging messages, each electronic device being suitable for using each frequency band in the plurality of frequency bands, a method allowing a selection of a so-called optimum frequency band among the plurality of frequency bands when the computer program is executed by the processor.

The invention also relates to a recording medium on which one or other of the above computer programs is stored.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 2:
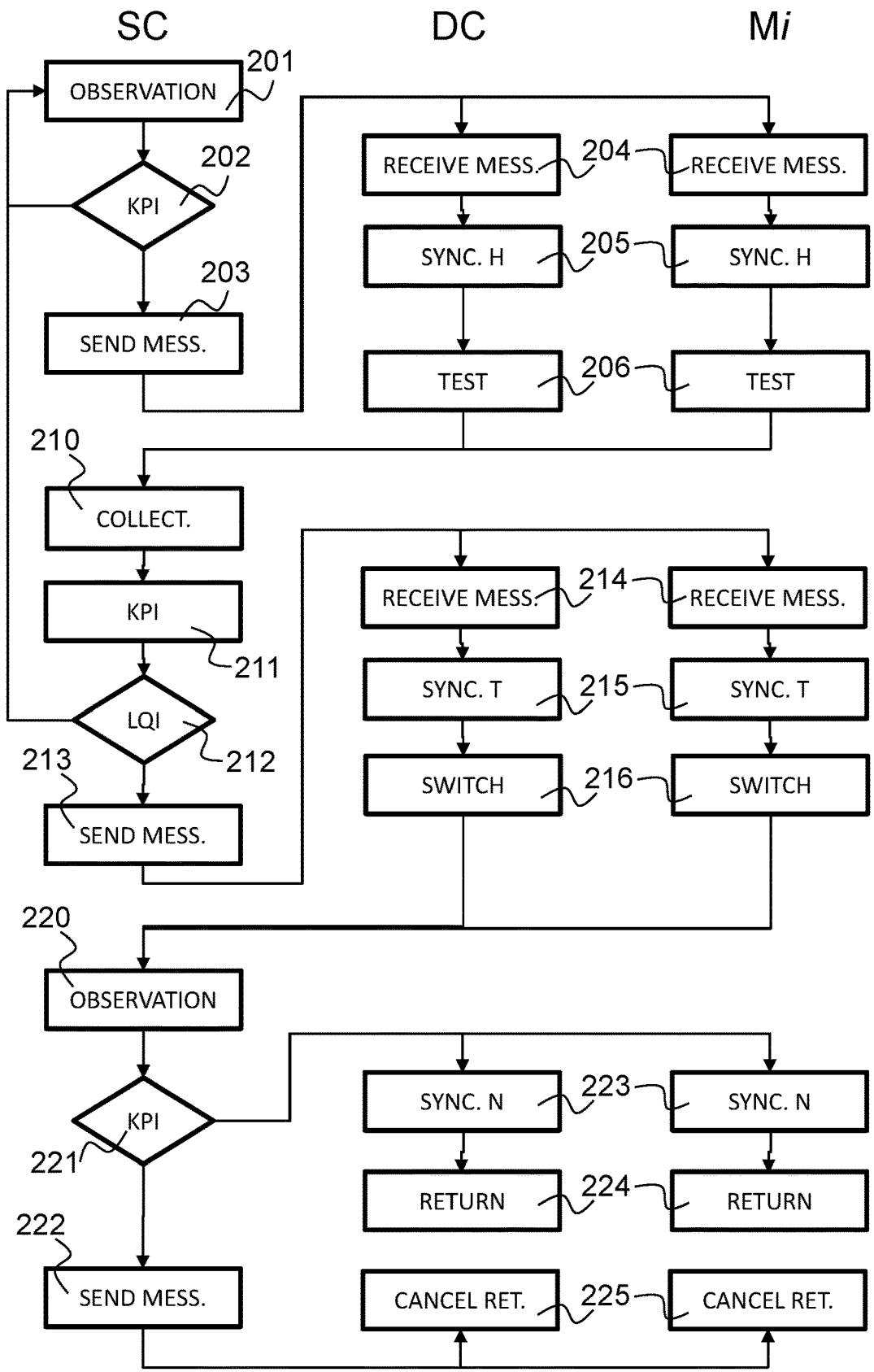
FIG. 2 illustrates schematically a method for selecting a so-called optimum frequency band among a plurality of frequency bands for a mesh communication network according to one embodiment of the invention.

FIG. 2 illustrates schematically a method for selecting a so-called optimum frequency band among a plurality of frequency bands for a mesh communication network 100 (hereinafter "network 100") according to one embodiment of the invention. The steps of the method are performed by the nodes DC, M1, M2, M3, . . . M15 of the mesh communication network 100 as well as by a control device SC. The control device SC is typically an electronic device such as a computer server hosted in an information system of the operator operating the network 100. According to an alternative embodiment of the invention, the functionalities of the control device SC are integrated in one of the nodes of the mesh communication network 100, for example in the data concentrator DC.

The method described below applies to a system comprising various nodes of a network 100 and a control device SC. A distinction is made between the nodes, distinguishing on the one hand the communicating meters M1, M2, M3 . . . M15 and the other data concentrator node DC. This difference relates only to the nature of the messages, protocols or instructions that are to be used for interacting with said node, the operating principle remaining similar.

Initially, not illustrated, the network 100 is deployed, all the nodes DC, M1, M2, M3, . . . M15 using the same predefined frequency band for communicating. The choice of this frequency band is a matter for the operator of the mesh communication network 100 and is dependent on the compatibility of the nodes with this frequency band. It is considered, for the remainder of the description, that each node DC, M1, M2, M3, . . . M15, that is to say the data concentrator DC and all the communicating meters M1, M2, M3, . . . M15, are all compatible with the same plurality of frequency bands. In other words, each node can possibly use one or other of the frequency bands in the plurality of frequency bands for communicating, that is to say receiving or sending messages to one or more nodes. However, only one frequency band among the plurality of frequency bands can be used at a given moment. Thus a node DC, M1, M2, M3, . . . M15 must switch from one frequency band to another frequency band in order to be able to use the latter frequency band.

In a first step 201, the control device SC determines information on the operating quality of the network 100. This quality information may be a performance indicator of a data collection application on the various nodes M1, M2, M3, . . . M15 of the network. The quality information may thus be a collection rate, representing the percentage of nodes for which a collection of data, for example data measuring electrical consumption for nodes of the communicating electricity meter type, has indeed functioned. The quality information may be a collection time, the collection time representing for example a time necessary for collecting data over all, or a predetermined number, of the nodes M1, M2, M3, . . . M15. The quality information may be determined over a predefined period, for example twenty-four hours, typically averaging the performance indicators over the period. Said period may be a sliding period.

At the end of this period, in a step 202, the control device SC determines whether the information on operating quality of the network 100 is below a first predetermined threshold. If the information on the operating quality of the network 100 is higher than the first predetermined threshold, this means that the operating quality of the network 100 is satisfactory, and the choice made for the frequency band used for the communications of the nodes on the network 100 is therefore suitable. The control device SC therefore returns to the step 201 of observing the operating quality of the network 100. On the other hand, if the information on operating quality of the network 100 is below the first predetermined threshold, this means that the operating quality of the network 100 is not satisfactory. This may mean that the initial choice made for the frequency band used for the communications of the nodes on the network 100 is not an optimum choice, since another frequency band may potentially be more suitable. In this case, a test procedure will be launched on the nodes in the network 100 as described below, the control device SC passing to step 203 of the method.

In step 203, the control device SC sends, to each node DC, M1, M2, M3, . . . M15, a first message comprising an instruction to perform a quality test on the plurality of frequency bands in a predetermined order and a first item of synchronisation information H for performing the quality test. According to one embodiment of the invention, the first message is sent directly by the control device SC to each node in the network 100. According to another embodiment of the invention, the control device SC sends the first message to the data concentrator DC, which relays the first message to the other nodes M1, M2, M3, . . . M15 in the network 100. The first message that is to be sent to each node in the network 100 can be sent in broadcast mode. Alternatively, and in order to better ensure that each message is correctly received, the first message may be sent in so-called unicast mode. The instruction to perform the quality test may take the form of a command of the DLMS/COSEM (Device Language Message Specification and Companion Specification for Energy Metering) type, with, as the COSEM attribute:

"LineQualityTestScheduler.execution_time" for a message intended for a node in the network 100 of the communicating meter type, and "LineQualityTest (execution_time)" for a message intended for the data concentrator DC.

"execution time" here being the first item of synchronisation information H. This synchronisation information H may be given in the form of a timestamp, that is to say a timetable, or an implementation time.

As explained below, this instruction to perform a quality test enables all the nodes to perform said quality test in a synchronised fashion. In particular, an order of testing the plurality of frequency bands must be defined in advance, as well as a duration of each test on each frequency band. This information (order of testing and duration of each test) must be configured in advance in each node in the network 100. Alternatively, the first message may comprise information enabling each node receiving said message to know the order of performance of the tests on each frequency band. Said information may be an ordered list of the frequency bands to be tested, or for example a reference to a predefined list known to each node. Similarly, information may correspond to the duration of testing of each frequency band.

In a step 204, each node in the network 100 receives, from the control device SC, the first message comprising the instruction to perform a quality test on the plurality of frequency bands in a predetermined order and the first item of synchronisation information for performing said quality test. Said first message has possibly passed via the data concentrator DC or other nodes in the network 100, as conventionally in a mesh communication network. The first message intended for the data concentrator DC may be different from the first message intended for a communicating meter, the communication standard and the instructions being able to differ according to the type of destination electronic device. Possibly each node in the network 100 sends in return, to the control device SC, a message acknowledging the first message.

In a following step 205, each node in the network 100 determines a moment of start of the quality test according to the first item of synchronisation information H. It should be noted that, conventionally, in a mesh communication network, particularly in a network in accordance with the G3-PLC standard, all the nodes in the network are synchronised in time, with a precision of around a few seconds. According to one embodiment of the invention, the first item of synchronisation information H corresponds to a time of the moment of start of the quality test situated approximately twenty-four hours after the moment of sending the first message. The method is then paused until the moment of start of the quality test.

At the start moment, defined by the first item of synchronisation information H, in a step 206 each node DC, M1, M2, M3, . . . M15 in the network 100 performs the quality test on the plurality of frequency bands. Possibly the control device SC, the data concentrator DC and/or each node in the network 100 first stop all communications, other than those necessary for the present method, during the quality test period. The duration of the test depends on the number of frequency bands to be tested, each frequency band being able to be tested for a typical period of one minute. The performance of the quality test comprises, for each node DC, M1, M2, M3, . . . M15 in the network 100, the steps:

of successively using, in the predetermined order, each frequency band in the plurality of frequency bands for a predetermined period associated with the frequency band used, and of recording, in association with each frequency band used, quality data associated with messages received by the electronic device during each predetermined period of use of the frequency band.

Thus, when the test begins, each node in the network 100 switches to a first frequency band, said frequency band being defined in the predefined order. Switching to a frequency band means that the node starts to use said frequency band instead of the frequency band used during the previous steps. Each frequency band in the plurality of frequency bands is thus successively used to be tested. In the case of a network 100 in accordance with the G3-PLC standard, each switching to a new frequency band of a node is carried out without performing the so-called G3 Bootstrap step. Thus each node remains subscribed to the G3-PLC network and to the data concentrator DC, the routing tables of each node being preserved. The duration or period of testing of each frequency band may be identical or may be different depending on the frequency band to be tested. By default, each period of testing a frequency band is predefined and has an identical value. During each period of testing a frequency band, each node records, in a table, for example the so-called POS (Personal Operating Space) table defined by the G3-PLC standard published in March 2017, the quality data associated with messages received by the electronic device during each predetermined period of use of the frequency band. The quality data may correspond to the forward LQI (forward Link Quality Indicator, defined for example in the G3-PLC standard, part 7.17.1.3 of the version published in April 2015 or March 2017). In the case of a node in accordance solely with the G3-PLC standard published in April 2015, said node records the quality of data in a specific table not provided for by the standard.

According to one embodiment of the invention, and in order to guarantee that each node receives messages in order to have quality data available, at least one predefined node in the network 100, for example the data concentrator DC, sends at least one message, preferably of the broadcast type, during each period of testing a frequency band. This message is preferably sent to all the nodes in the network 100. According to a supplementary embodiment of the invention, each node sends at least one message during each test period, possibly of the broadcast type and at a predefined moment in each test period in order to reduce risks of collisions.

Thus, during or in a period of testing of a frequency band, each node collects quality data, for example LQIs, associated with the frequency band tested. At the end of each test period, these data are recorded and kept in association with the frequency band tested. Thus, at the end of the quality test, each node has collected and recorded quality data in association with each frequency band in the plurality of frequency bands tested. If the quality data are recorded in a POS table, each node makes a copy of its POS table, at least of the quality data contained in said POS table, before passing to the test of the following frequency band. Thus quality data are kept, by each node, for each frequency band tested.

According to one embodiment, at the end of the quality test, each node re-switches into the frequency band initially used before the start of the quality test. According to an alternative embodiment, each node switches at the end of the quality test into a predefined frequency band, common to all the nodes.

At the end of the quality test, the control device SC, the data concentrator DC and/or each node in the network 100 re-initiates all the previously stopped communications.

In a following step 210, the control device SC collects, for each node DC, M1, M2, M3, . . . M15 in the network 100, the quality data associated with each frequency band tested. According to one embodiment of the invention, the collection is made at the initiative of the control device SC, the latter sending a message, preferably of the unicast type, to each node and receiving in return a message comprising the quality data. According to an alternative embodiment of the invention, each node, at the end of the quality test step 206, and possibly after a random waiting time, sends, to the control device SC, a message comprising the quality data associated with each frequency band.

According to one embodiment of the invention, each node DC, M1, M2, M3, . . . M15 can send a message intended for the control device, the message being in accordance with the DLMS/COSEM specifications and such that the attribute COSEM is equal to:
  "LineQualityTestResult.buffer", which takes the form of a matrix comprising, for each frequency band tested, an extract from the POS table (or a table containing equivalent information) comprising identifiers of nodes adjacent to the sending node and, for each neighbour, at least one associated LQI.

In a following step 211, the control device SC determines, for each frequency band, a quality indicator associated with said frequency band from the quality data collected. This is because, following step 210 of collecting the quality data, the control device SC has, for each frequency band, associated quality data issuing from each node.

According to one embodiment of the invention, the control device SC determines, for each unidirectional link (a unidirectional link being defined by a sending node and a receiving node that is a node adjacent to the sending node, each "sender to receiver" and "receiver to sender" direction defining a different unidirectional link) and, for each frequency band in the plurality of frequency bands tested, a quality indicator, for example an LQI. Said LQI may be equal to the collected LQI, or be a mean—or a minimum or a maximum depending on the embodiment—if several LQI values are available for a given link. It is then possible that the quality data may not be available for certain links with certain frequency bands. This is the case for example if, for a frequency band tested, that is to say used, communication is not possible between two nodes. According to a first variant of the present embodiment, the control device SC does not take account of the links for which quality data—an LQI for example—are not associated for each of the frequency bands in the plurality of frequency bands. In other words, the links for which quality data are absent in association with at least one frequency band are ignored. The control device SC then determines, for each frequency band, a quality indicator being equal to the percentage of links for which the quality data, for example the LQI, are above a predefined threshold. Thus, for example, the quality indicator associated with each frequency band is defined as being equal to the percentage of links for which the LQI is higher than a predefined LQI value. According to a second variation of the present embodiment of the invention, the control device SC takes into account all the links, regardless of whether or not quality data are associated with these links for each of the frequency bands. The control device SC then determines, for each frequency band, a quality indicator being equal to the percentage of links for which the quality data, for example an LQI, are above a predefined threshold, the number of links then being able to vary according to the frequency band taken into account. According to an alternative to the second variation of the second embodiment of the invention, the control device SC determines a quality indicator by determining, for each frequency band, not a percentage but a number of links for which the quality data, for example the LQI, are above a predetermined threshold.

It is possible to determine a quality indicator for each frequency band according to a different method from the quality data collected Ultimately, at the end of step 211, a quality indicator is associated with each frequency band in the plurality of frequency bands. By convention, it will be considered that the high values of the quality indicator correspond to a better quality (consistent with the fact that a higher value of the LQI corresponds to a better-quality link).

In the following step 212, the control device SC selects a frequency band, referred to as the optimum frequency band, from the plurality of frequency bands, said so-called optimum frequency band being the frequency band associated with a quality indicator of maximum value. In other words, the control device SC selects, from the plurality of frequency bands, the frequency band associated with the highest value of the quality indicator. Said frequency band is said to be the optimum frequency band since it corresponds to the frequency band making it possible to maximise the global quality of the links between the nodes.

When the so-called "optimum" frequency band corresponds to the frequency band initially used, that is to say the frequency band used by the nodes in the network 100 in steps 201 to 205, and then possibly 210 to 212, of the method, it is not opportune to switch the nodes in the network 100 to another frequency band. This is because the frequency band used is the optimum frequency band. In this case, the method for selecting an optimum frequency band recommences at step 210, possibly after a predefined waiting time.

In the contrary case, when the so-called optimum frequency band corresponds to a second frequency band different from the first frequency band initially used by the nodes in the network 100 in steps 201 to 205, and then possibly 210 to 212, of the method, it is opportune to switch the nodes in the network 100 to this so-called optimum second frequency band. The control device SC then passes to step 213.

In step 213, the control device SC sends, to each node in the network 100, a second message comprising an instruction to use the so-called optimum second frequency band instead of the first frequency band initially used.

According to one embodiment of the invention, the second message comprises a second item of synchronisation information T. According to a supplementary embodiment of the invention, the second message comprises, apart from the second item of synchronisation information T, a third item of synchronisation information N.

Thus the control device SC sends, to each node DC, M1, M2, M3, ... M15 in the network 100, a message comprising an instruction to switch to the so-called optimum frequency band. This message is preferentially sent in unicast mode in order to be able to ensure correct reception thereof. The second message possibly comprises a second item of synchronisation information T making it possible to synchronise the switching of the nodes to the so-called optimum frequency band at the same moment. The second message possibly comprises a third item of synchronisation information N for defining a backtracking time, for each node, to the first frequency band initially used in the event of a problem ("fallback solution").

The DLMS/COSEM commands corresponding to the instructions sent are:
for a node M1, M2, M3, ... M15 of the communicating meter type:
PlcG3MacBandSelectionScheduler.execution_time (second item of synchronisation information), and
PlcG3MacBandSelectionTimeout.value (third item of synchronisation information),
for a node DC of the data concentrator type:
PLC G3 Band Plan selection (so-called optimum frequency band).

In a step 214, each node DC, M1, M2, M3, ... M15 in the network 100 receives the second message. According to one embodiment of the invention, in the absence of the second item of synchronisation information T, each node can switch to the so-called optimum frequency band on reception of the second message.

If the second message comprises the second item of synchronisation information T, each node DC, M1, M2, M3, ... M15 in the network 100 determines a switching moment according to the second item of synchronisation information T. The second item of synchronisation information T may correspond to a predefined moment or to a time period. Each node next awaits said moment to switch to the so-called optimum frequency band, which allows a global switching of the nodes in the network 100 at the same moment, referred to as the switching moment. The cutting of communications between the nodes is therefore limited in time.

In a step 216, at the switching moment defined in step 215 according to the second item of synchronisation information T, all the nodes in the network 100 switch to the so-called optimum second frequency band. In other words, each node, as from this moment, uses the so-called optimum second frequency band for sending and receiving messages.

If a third item of synchronisation information N is included in the second message, or if each node comprises in a predefined manner an item of information similar to the third item of synchronisation information N for defining a backtracking time, then each node in the network functions normally using the so-called optimum second frequency band up until the backtracking moment defined according to the third item of synchronisation information N or predefined. At that backtracking moment, and in the absence of any contrary instruction received in the meantime, each node automatically re-switches to the first frequency band initially used. This protection mechanism guarantees a return to a normal situation in the case where an unsuitable second frequency band was selected in steps 212 and 213.

In a step 220, the control device SC, between the switching moment, that is to say the moment of start of use of the second frequency band, and the backtracking moment at the use of the first frequency band defined according to the third item of synchronisation information N, determines an item of information on the operating quality of the communication network. In other words, in a similar fashion to step 201, and once the switching of all the nodes has been performed, the control device determines an item of information on the operating quality of the network 100. This quality information must be determined before any backtracking of all the nodes in the network 100, that is to say before the moment determined according to the third item of synchronisation information N, in order to enable the sending of a backtracking-cancellation instruction on time.

In a step 221, if the quality information is above a second threshold, then the choice of the so-called optimum frequency band has indeed been opportune, and it is possible to cancel the backtracking of the nodes in the network 100 to the first frequency band initially used. The control device SC then passes to a step 222 of sending the backtracking-cancellation message.

The information on operating quality of the network 100 can be determined continuously on a sliding time window, the test carried out in step 221 then being carried out continuously. The backtracking-cancellation message is sent, in a step 222, as soon as the quality information is above the second threshold.

Step 222 corresponds to the sending, by the control device SC, of a message comprising a backtracking-cancellation instruction to each node in the network 100. The cancellation instruction may consist of a resetting to zero of the backtracking moment defined in step 223.

The value of the second threshold may be predefined, for example by taking a value identical to the first threshold used in step 202. Preferentially, the value of the second threshold is chosen as being at least equal to the value of the operating-quality information determined in step 201, that is to say when the network 100 used the first frequency band. Thus the so-called optimum second frequency band is kept only if the operating indicator determined in step 220 indicates an improvement in the global performances of the network 100 compared with a functioning of the network 100 using the first frequency band initially used.

In step 221, if at any moment the quality information determined in step 220 is not above the second threshold, then step 222 of sending the backtracking-cancellation message is not performed by the control device SC.

In this case, each node in the network 100 having previously determined, in a step 223, a backtracking moment according to the third item of synchronisation information N, and in a step 224 as from the backtracking moment, each node DC, M1, M2, M3, ... M15 in the network 100 once again uses the first frequency band initially used for sending and receiving messages instead of the so-called optimum frequency band. In other words, as from the backtracking moment, each node re-switches to the frequency band initially used.

It is possible that, in step 213 of sending switching messages to the so-called optimum frequency band, the control device may identify a node in the network 100 that does not respond to the switching instruction. In this case, at the time of switching to the so-called optimum second frequency band, said node is still using the first frequency band initially used. This node, referred to as a faulty node, is therefore, as from the moment of switching, and assuming that the switching is not then cancelled, completely cut off from the rest of the nodes in the network 100. The control device SC can then implement a method for reconnecting the so-called faulty node to the other nodes in the network 100.

In a first step, concomitant with step 213, the control device identifies a node, referred to as a faulty node, said node not having for example acknowledged the switching instruction sent in step 213. Possibly, the instruction message being sent in fact by the data concentrator DC, it is the data concentrator DC that identifies the faulty node and sends the information to the control device SC.

The control device SC next, via information previously collected on the topology of the network 100 (for example results of commands of the "path discovery" type), determines a node adjacent to the faulty node. The choice of an adjacent node makes it possible to guarantee direct communication between the two nodes.

The control device SC then sends, via the data concentrator DC, a message to said adjacent node, said message comprising an identifier of the so-called faulty node in the network and an indication of a third frequency band among the plurality of frequency bands, possibly the frequency band used initially. Following the reception of this message, the adjacent node performs the following steps:

switching to the third frequency band, that is to say the frequency band used initially and on which the faulty node has possibly remained configured, sending to the so-called faulty node, corresponding to the identifier received, a message comprising an instruction to use the so-called optimum frequency band and an acknowledgement instruction, at the expiry of a predefined waiting time or on reception of the acknowledgement, re-switching to the so-called optimum frequency band, and then sending a message to the control device SC comprising information on the correct reception, or not, of the acknowledgement.

This method can be repeated as many times as necessary until the faulty node acknowledges the correct reception of the command to switch to the so-called optimum frequency band. The method can thus be used for switching any node in the network 100 wrongly using a frequency band different from the one used by the other nodes, the third frequency band then accordingly being chosen equal to the frequency band wrongly used.

The DLMS/COSEM command corresponding to the instruction sent to the adjacent node is for example:

"FrequencyBandAdjustment", with as arguments the so-called optimum frequency band to be used by the faulty node and an identifier of the faulty node. In return, the control device receives a message comprising information on the success or not of the operation.

It should be noted that, in an alternative embodiment, all or some of the steps performed in the present method by the control device SC can be performed by the data concentrator DC.

Figure 3:
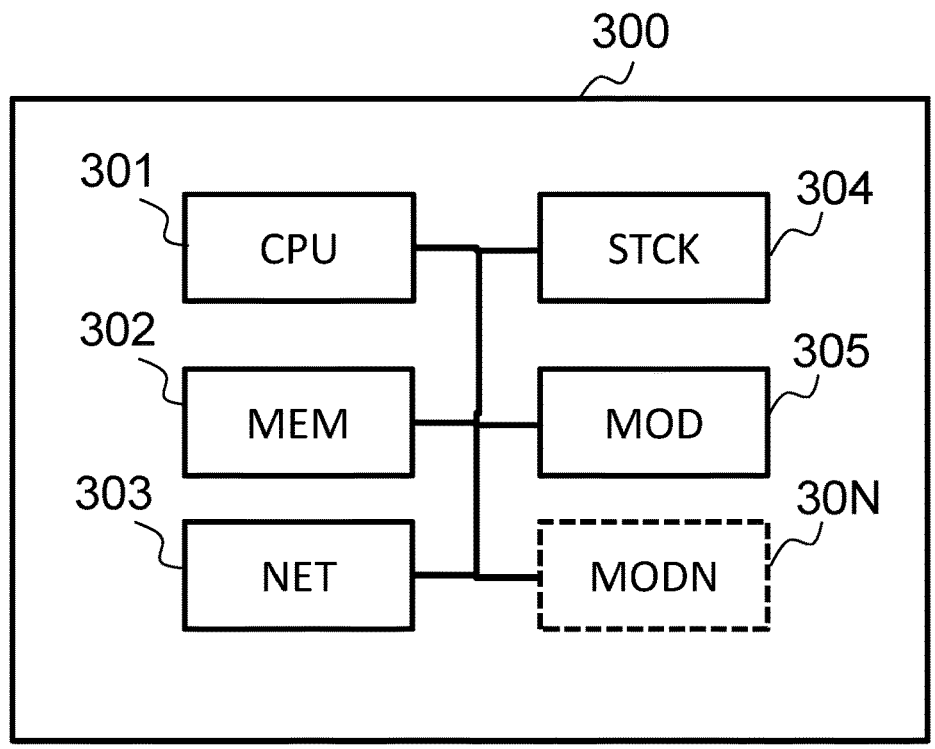
FIG. 3 illustrates schematically the hardware architecture of an electronic device of a mesh communication network, the electronic device being suitable for selecting a so-called optimum frequency band among a plurality of frequency bands, according to one embodiment of the invention.

FIG. 3 illustrates schematically the hardware architecture of a node or electronic device 300 in a mesh communication network 100, the electronic device 300 being suitable for selecting a so-called optimum frequency band from a plurality of frequency bands, according to one embodiment of the invention. The electronic device 300 corresponds to a node in the network 100, more particularly to the data concentrator DC or to one of the communicating meters M1, M2, M3 . . . M15 in FIG. 1. The electronic device 300 is suitable for being able to use each frequency band in the plurality of frequency bands. The electronic device 300 is suitable for:

receiving, coming from a control device SC, a first message comprising an instruction to perform a quality test on the plurality of frequency bands in a predetermined order and a first item of synchronisation information H for performing said quality test, determining a moment of start of the quality test according to the first item of synchronisation information H, and as from said start moment, successively using, in the predetermined order, each frequency band in the plurality of frequency bands for a predetermined period associated with the frequency band used, recording, in association with each frequency band used, quality data associated with messages received by the electronic device during each predetermined period of use of the frequency band, sending, to the control device SC, a message comprising the quality data associated with each frequency band, and when a second message is received comprising an instruction to switch to a so-called optimum second frequency band, using the so-called optimum second frequency band instead of the first frequency band for sending and receiving messages.

The electronic device 300 comprises, connected by a communication bus: a processor or CPU (central processing unit) 301; a memory MEM 302 of the RAM (random access memory) and/or ROM (read only memory) type, a network module NET 303, storage module STCK 304 of the internal storage type, and possibly other modules 305 to 30N of various natures. The storage module STCK 304 may be of the hard disk type HDD (hard disk drive) or SSD (solid-state drive), or of the external storage medium reader type, such as an SD (Secure Digital) card reader. The processor CPU 301 can record data, or information, in the memory MEM 302 or in the storage module STCK 304. The processor CPU 301 can read data recorded in the memory MEM 302 or in the storage module STCK 304. These data may correspond to configuration parameters, instructions, quality parameters relating to messages received or to information or instructions received for example in a message received via the network module NET 303 (or via a communication module 30N providing a connection to the network 110 in the case of the data concentrator DC). The network module NET 303 provides the connection of the electronic device 300 to the mesh communication network 100 via a shared medium, for example an electrical network. The network module NET 303 can provide the connection of the electronic device 300 to an electronic device such as a data concentrator DC, for example via technology of the PL (powerline) type. The network module NET 303 enables the electronic device 300 to send, and respectively receive, messages to, and respectively coming from, one or more adjacent electronic devices, said electronic devices being connected to the same mesh communication network 100 via the shared medium. In the case of the data concentrator DC, the electronic device 300 further comprises a communication module, for example a module 30N, providing connection of the electronic device 300 to the network 110. A module 30N may correspond to a module metering electrical consumption in the case where the electronic device 300 is a communicating electricity meter.

The processor CPU 301 is capable of executing instructions loaded into the memory MEM 302, for example from the storage module STCK 304 or from a communication network via the network module NET 303, or from another communication module 30N for example. When the electronic device 300 is powered up, the processor CPU 301 is capable of reading instructions from the memory MEM 302 and executing them. These instructions form a computer program causing the implementation, by the processor CPU 301, of all or some of the methods and steps described above, particularly in the description of FIG. 2. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the electronic device 300 can be integrated in a communicating meter or a concentrator of a mesh communication network by updating software (updating firmware).

Figure 4:
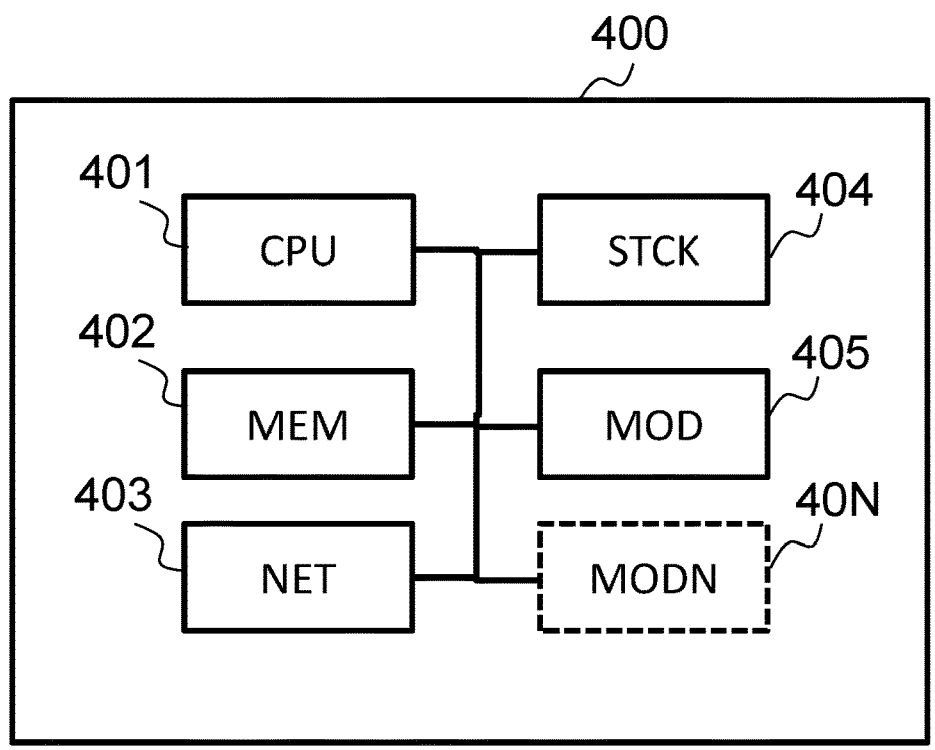
FIG. 4 illustrates schematically the hardware architecture of a control device of a mesh communication network, the control device being suitable for selecting a so-called optimum frequency band among a plurality of frequency bands, according to one embodiment of the invention.

FIG. 4 illustrates schematically the hardware architecture of an electronic device 400 corresponding to the control device SC of a mesh communication network 100, the control device SC being suitable for selecting a so-called optimum frequency band from a plurality of frequency bands according to one embodiment of the invention.

The electronic device 400, or control device SC, is suitable for:
  determining information on the operating quality of the mesh communication network 100,
  if the information on operating quality of the communication network 100 is below a first threshold, then:
  sending, to each node or electronic device M1, M2, M3, . . . M15, a first message comprising an instruction to perform a quality test on the plurality of frequency bands in a predetermined order and a first item of synchronisation information H for performing said quality test,
  collecting, at the end of the quality test, for each electronic device M1, M2, M3 . . . M15, quality data associated with each frequency band,
  determining, for each frequency band, a quality indicator associated with the frequency band from the quality data collected, and
  selecting a so-called optimum frequency band from the plurality of frequency bands, said so-called optimum frequency band being the frequency band associated with a quality indicator of maximum value,
  when the so-called optimum frequency band corresponds to a second frequency band different from the first frequency band, then:
  sending, to each electronic device M1, M2, M3, . . . M15, a second message comprising an instruction to use the so-called optimum second frequency band instead of the first frequency band.

The electronic device 400 comprises, connected by a communication bus: a processor or CPU (central processing unit) 401; a memory MEM 402 of the RAM (random access memory) and/or ROM (read only memory) type, a network module NET 403, a storage module STCK 404 of the internal storage type and possibly other modules 405 to 40N of various natures. The storage module STCK 404 may be of the hard disk HDD (hard disk drive) or SSD (solid-state drive) type, or of the external storage medium reader type, such as an SD (Secure Digital) card reader. The processor CPU 401 can record data, or information, in the memory MEM 402 or in the storage module STCK 404. The processor CPU 401 can read data recorded in the memory MEM 402 or in the storage module STCK 404. These data may correspond to configuration parameters, quality parameters related to messages received or to information received, for example in a message received via the network module NET 403, or via another communication module 40N. The network module NET 403 provides connection of the electronic device 400 to a communication network 110, for example of the internet type. The network module NET 403 can provide the connection of the electronic device 400 to an electronic device such as a data concentrator DC, for example via technology of the Ethernet type. The network module NET 403 enables the electronic device 400 to send, and respectively receive, messages intended for, and respectively coming from, one or more electronic devices, typically the data concentrator DC.

The processor CPU 401 is capable of executing instructions loaded into the memory MEM 402, for example from the storage module STCK 404 or from a communication network via the network module NET 403, or from another communication module 40N for example. When the electronic device 400 is powered up, the processor CPU 401 is capable of reading instructions from the memory MEM 402 and executing them. These instructions form a computer program causing the implementation, by the processor CPU 401, of all or some of the methods and steps described above, particularly in the description of FIG. 2. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the electronic device 400 can be integrated in a control device SC hosted in an information system of an operator of a network 100 by the installation or updating of an item of software.

The references to the G3-PLC standard (or protocol) in the present document are made for the versions of the G3-PLC standard as published in April 2015 and March 2017.

Figure 1:
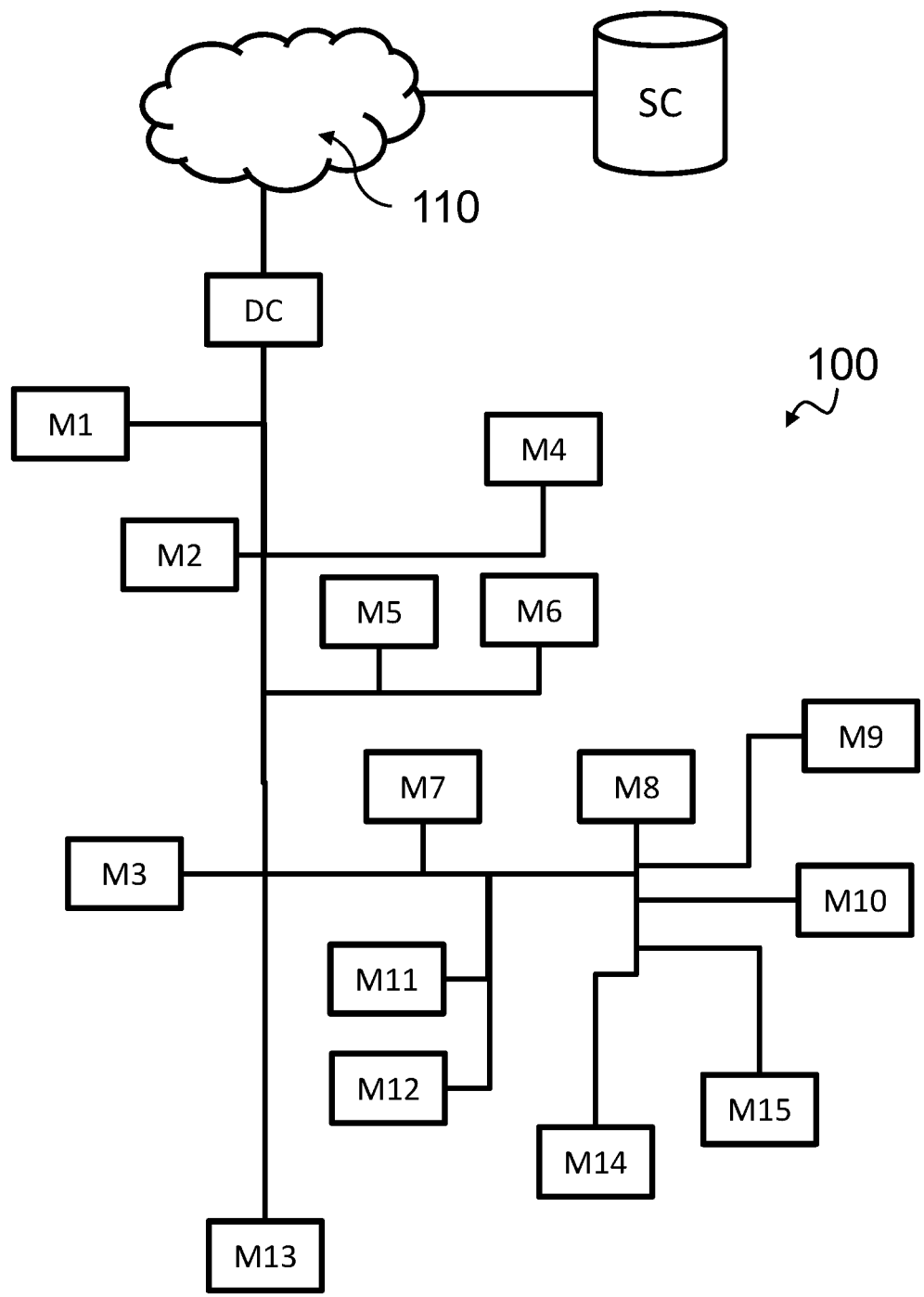
FIG. 1 illustrates schematically a mesh communication network comprising a plurality of connected electronic devices, and a control device, for example in accordance with the G3-PLC standard.

Only fifteen nodes or electronic devices M1, M2, M3, . . . M15 are shown in FIG. 1 by way of example, this is in no way a limitation on the number of nodes in the network 100. The present invention can be implemented with a plurality of nodes.

In the present invention, it must be understood that, when a node switches (from a first frequency band) to a second frequency band this means that this node uses said second frequency band (instead of the first frequency band) for sending and receiving messages.

The invention claimed is:

1. An electronic device of a mesh communication network comprising a plurality of electronic devices connected to a shared medium and using a first frequency band among a plurality of frequency bands for exchanging messages, the electronic device being suitable for using each frequency band in the plurality of frequency bands, the electronic device being configured to use only one frequency band at a time, the electronic device being suitable for:
  receiving, from a control device, a first message comprising an instruction for performing a quality test on the plurality of frequency bands in a predetermined order and first synchronization information for performing said quality test,
  determining a start time of the quality test according to the first synchronization information, and as from said start time, successively using, in the predetermined order, each frequency band in the plurality of frequency bands for a predetermined period associated with the frequency band used, sending messages to all the electronic devices, recording, in association with each frequency band used, quality data associated with messages received by the electronic device during each predetermined period of use of the frequency band, sending, to the control device, a message comprising the quality data associated with each frequency band, and when a second message is received comprising an instruction to switch to a second frequency band, using the second frequency band instead of the first frequency band for sending and receiving messages.

2. A system for the mesh communication network allowing selection of an optimum frequency band from the plurality of frequency bands, the system comprising:

the plurality of electronic devices according to claim 1, the control device for the mesh communication network comprising the plurality of electronic devices connected to the shared medium and using the first frequency band among the plurality of frequency bands for exchanging messages, the control device being suitable for using each frequency band in the plurality of frequency bands, the control device being configured to use only one frequency band at a time, the control device being suitable for:

sending, to each electronic device, the first message comprising the instruction to perform the quality test on the plurality of frequency bands in the predetermined order and the first synchronization information for performing said quality test, collecting, at the end of the quality test, for each electronic device, the quality data associated with each frequency band, determining, for each frequency band, a quality indicator associated with the frequency band from the quality data collected, and selecting the optimum frequency band among the plurality of frequency bands, said optimum frequency band being the frequency band associated with a quality indicator of maximum value, when the optimum frequency band corresponds to the second frequency band different from the first frequency band, then:

sending, to each electronic device, a second message comprising an instruction to use the second frequency band instead of the first frequency band.

3. An electronic device according to claim 1, the second message comprising second synchronization information, the electronic device being suitable for using the second frequency band instead of the first frequency band for sending and receiving messages as from a time determined according to the second synchronization information.

4. A system for a mesh communication network allowing selection of the optimum frequency band from the plurality of frequency bands, the system comprising:

the plurality of electronic devices according to claim 3, and the control device for the mesh communication network comprising a plurality of electronic devices connected to the shared medium and using the first frequency band among the plurality of frequency bands for exchanging messages, the control device being suitable for using each frequency band in the plurality of frequency bands, the control device being configured to use only one frequency band at a time, the control device being suitable for:

sending, to each electronic device, the first message comprising the instruction to perform the quality test on the plurality of frequency bands in the predetermined order and first synchronization information for performing said quality test, collecting, at the end of the quality test, for each electronic device, quality data associated with each frequency band, determining, for each frequency band, a quality indicator associated with the frequency band from the quality data collected, and selecting the optimum frequency band among the plurality of frequency bands, said optimum frequency band being the frequency band associated with a quality indicator of maximum value, when the optimum frequency band corresponds to a second frequency band different from the first frequency band, then:

sending, to each electronic device, a second message comprising an instruction to use the second frequency band instead of the first frequency band.

5. A method for a mesh communication network comprising a plurality of electronic devices connected to a shared medium and using a first frequency band among a plurality of frequency bands for exchanging messages, each electronic device being suitable for using each frequency band in the plurality of frequency bands, each electronic device being configured to use only one frequency band at a time, and a corresponding control device, the method allowing selection of an optimum frequency band from the plurality of frequency bands, the method being executed by each electronic device and comprising:

receiving, from the corresponding control device, a first message comprising an instruction to perform a quality test on the plurality of frequency bands in a predetermined order and a first synchronization information (H) for performing said quality test, determining a start time of the quality test according to the first synchronization information, and as from the start time, successively using, in the predetermined order, each frequency band in the plurality of frequency bands for a predetermined period associated with the frequency band used, recording, in association with each frequency band used, quality data associated with messages received during each predetermined period of use of the frequency band, sending, to the corresponding control device, a message comprising the quality data associated with each frequency band, and when a second message is received comprising an instruction to switch to a second frequency band, using the second frequency band instead of the first frequency band for sending and receiving messages.

6. The method according to claim 5, wherein the second message comprising second synchronization information, the step of using the second frequency band instead of the first frequency band for sending and receiving messages is performed as from a time determined according to the second synchronization information.

7. The method according to claim 6, wherein the second message comprising third synchronization information, the message comprising a subsequent step of:

once again using the first frequency band for sending and receiving messages as from a time determined according to the third synchronization information.

8. The method according to claim 7, further comprising: subsequently to the step of using the second frequency band:
receiving a message comprising an identifier of an electronic device in the network and an indication of a third frequency band among the plurality of frequency bands,
switching to the third frequency band,
sending, to the electronic device corresponding to the identifier received, a message comprising an instruction to use the optimum frequency band and an acknowledgement instruction,
at the expiry of a predefined waiting time or on reception of the acknowledgement instruction, switching to the optimum frequency band, and then
sending a message to the corresponding control device comprising information on the correct reception of the acknowledgement instruction.

9. A non-transitory computer readable medium embodying a computer program that comprises instructions for implementation, by a processor for exchanging messages, the electronic device being suitable for using each frequency band in the plurality of frequency bands, a method for selecting the optimum frequency band among the plurality of frequency bands according to claim 5, when the computer program is executed by the processor.

10. A control device for a mesh communication network comprising a plurality of electronic devices connected to a shared medium and using a first frequency band among a plurality of frequency bands for exchanging messages, the control device being suitable for using each frequency band in the plurality of frequency bands, the control device being configured to use only one frequency band at a time, the control device being suitable for:
sending, to each electronic device, a first message comprising an instruction to perform a quality test on the plurality of frequency bands in a predetermined order and first synchronization information for performing said quality test,
collecting, at the end of the quality test, for each electronic device, quality data associated with each frequency band,
determining, for each frequency band, a quality indicator associated with the frequency band from the quality data collected, and
selecting an optimum frequency band among the plurality of frequency bands, said optimum frequency band being the frequency band associated with a quality indicator of maximum value,
when the optimum frequency band corresponds to a second frequency band different from the first frequency band, then:
sending, to each electronic device, a second message comprising an instruction to use the second frequency band instead of the first frequency band.

11. A control device according to claim 10, the control device further being suitable for:
determining information on operating quality of the mesh communication network.

12. A control device according to claim 11, the second message comprising second synchronization information and third synchronization information, the second synchronization information defining a start time of use of the second frequency band by each electronic device, the third synchronization information defining a time for each electronic device to return to the use of the first frequency band, the control device is further suitable for:
determining, between the start time of use of the second frequency band and the time of return to the use of the first frequency band, information on the operating quality of the communication network, and
when said information on operating quality of the communication network is higher than a second threshold, then:
sending, to each electronic device, a third message comprising an instruction for cancellation of re-use of the first frequency band at the time defined by the third synchronization information.

13. A method, for a mesh communication network comprising a plurality of electronic devices connected to a shared medium and using a first frequency band among a plurality of frequency bands for exchanging messages, each electronic device being suitable for using each frequency band in the plurality of frequency bands, and a control device, the method making it possible to select an optimum frequency band among the plurality of frequency bands, the method being executed by the control device and comprising:
determining information on operating quality of the communication network,
if the information on operating quality of the communication network is below a first threshold, then:
sending, to each electronic device, a first message comprising an instruction to perform a quality test on the plurality of frequency bands in a predetermined order and first synchronization information for performing said quality test,
collecting, at the end of the quality test, for each electronic device, quality data associated with each frequency band,
determining, for each frequency band, a quality indicator associated with the frequency band from the quality data collected, and
selecting the optimum frequency band among the plurality of frequency bands, said optimum frequency band being the frequency band associated with a quality indicator of maximum value,
when the optimum frequency band corresponds to a second frequency band different from the first frequency band, then:
sending, to each electronic device, a second message comprising an instruction to use the second frequency band instead of the first frequency band.

14. The method according to claim 13, wherein the second message comprising second synchronization information and third synchronization information, the second synchronization information making it possible to define a start time of use of the second frequency band by each electronic device, the third synchronization information making it possible to define a time for each electronic device to return to the use of the first frequency band, the method further comprises:
determining, between the start time of use of the second frequency band and the time of return to the use of the first frequency band, information on the operating quality of the communication network, and
when said information on operating quality of the communication network is higher than a second threshold, then:
sending, to each electronic device, a third message comprising an instruction for cancellation of re-use of the first frequency band at the time defined by the third synchronization information.

15. A non-transitory computer readable medium embodying a computer program that comprises instructions for implementation, by a processor for exchanging messages, each electronic device being suitable for using each frequency band in the plurality of frequency bands, a method allowing a selection of the optimum frequency band among the plurality of frequency bands according to claim 13, when the computer program is executed by the processor.

16. A non-transitory computer readable medium embodying a computer program that comprises instructions for the implementation, by a processor for exchanging messages, each electronic device being suitable for using each frequency band in the plurality of frequency bands, a method allowing a selection of the optimum frequency band among the plurality of frequency bands according to claim 14, when the computer program is executed by the processor.

* * * * *